US005986779A

United States Patent
Tanaka et al.

[19]

[11] Patent Number: 5,986,779
[45] Date of Patent: *Nov. 16, 1999

[54] MULTIPLE FOCUS LENS, AN OPTICAL HEAD APPARATUS AND AN OPTICAL INFORMATION RECORDING-REPRODUCING APPARATUS

[75] Inventors: Yasuhiro Tanaka, Hyogo; Michihiro Yamagata, Osaka; Yoshiaki Komma, Kyoto; Sadao Mizuno, Osaka, all of Japan

[73] Assignee: Matsushita Electric Industrial Co., Ltd.

[ * ] Notice: This patent issued on a continued prosecution application filed under 37 CFR 1.53(d), and is subject to the twenty year patent term provisions of 35 U.S.C. 154(a)(2).

[21] Appl. No.: 08/695,397
[22] Filed: Aug. 12, 1996

[30] Foreign Application Priority Data

Aug. 18, 1995 [JP] Japan .................................. 7-210735

[51] Int. Cl.$^6$ ....................................................... G02B 5/32
[52] U.S. Cl. ............................... 359/19; 359/16; 359/566; 359/570; 365/216
[58] Field of Search ................................ 359/16, 19, 566, 359/570; 365/215, 216; 369/94, 103

[56] References Cited

U.S. PATENT DOCUMENTS 5,161,040  11/1992  Yokoyama et al. ...................... 359/19
5,349,471   9/1994  Morris et al. ........................... 359/565
5,446,565   8/1995  Komma et al. ........................... 359/19
5,473,471  12/1995  Yamagata et al. ...................... 359/566

FOREIGN PATENT DOCUMENTS 0 468 410 A1  1/1992  European Pat. Off. .
0 610 055 A2  8/1994  European Pat. Off. .

OTHER PUBLICATIONS

*Optical Review*, vol. 1, No. 1 (1994):27–29, "Dual Focus Optical Head for 0.6 mm and 1.2 mm Disks," Yoshiaki Komma, Seiji Nishino and Sadao Mizuno.

*Primary Examiner*—Jon W. Henry
*Assistant Examiner*—Darren E. Schuberg
*Attorney, Agent, or Firm*—Morrison & Foerster LLP

[57] ABSTRACT

Coma of an objective lens occurs depending on the lens-forming condition when plural disks of different substrate thickness are recorded and reproduced. An objective lens according to this invention is not influenced by the coma even if the thickness of the substrates is changed. For this purpose, a diffraction grating whose aberration is corrected is formed on the first side of an aspheric objective lens. Due to this correction, light beams having different diffraction orders, e.g. 0th order diffracted light and +1st order diffracted light, are focused respectively on two kinds of substrates of different thickness. The whole objective lens is tilted to correct its axial coma, and the tilt angle is predetermined to be substantially identical with respect to plural substrates which are different in thickness.

21 Claims, 15 Drawing Sheets

SA, OSC

AS

.002

SA, OSC

.002

AS

SA, OSC

AS

.002  .002
SA, OSC  AS

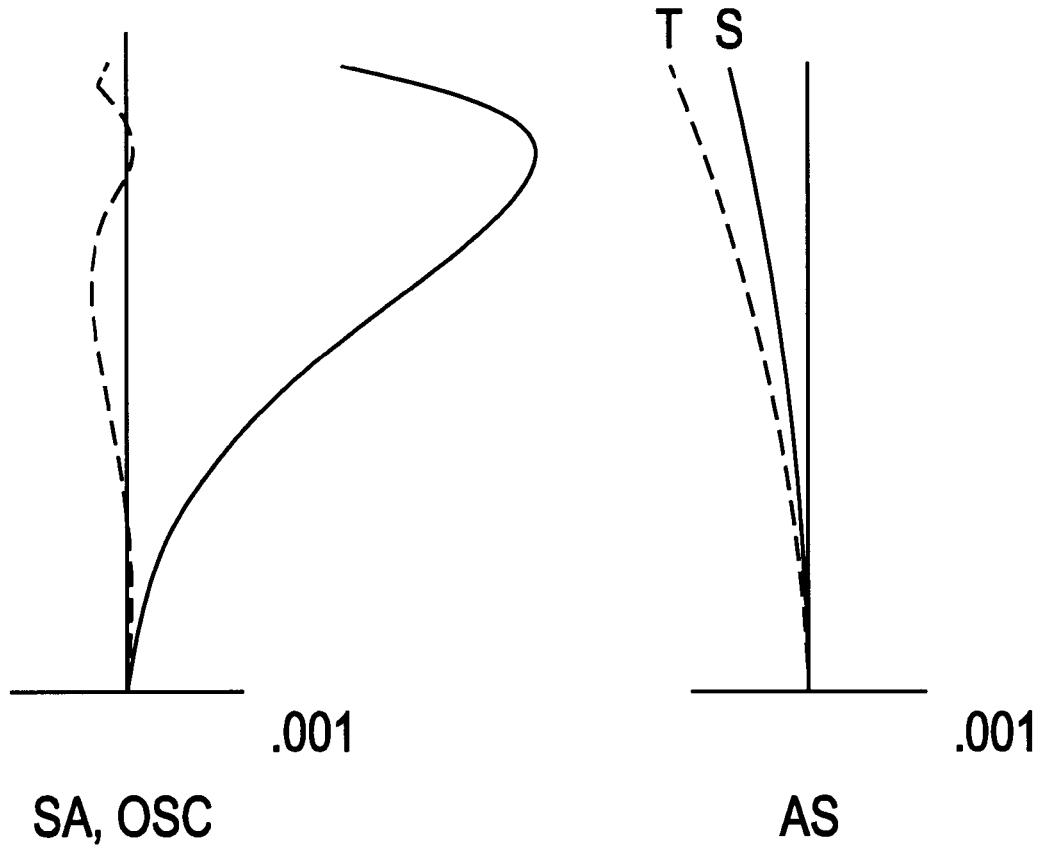

.002

SA, OSC

T S

.002

AS

SA, OSC

AS

.002
SA, OSC

T S

.002
AS

SA, OSC

AS

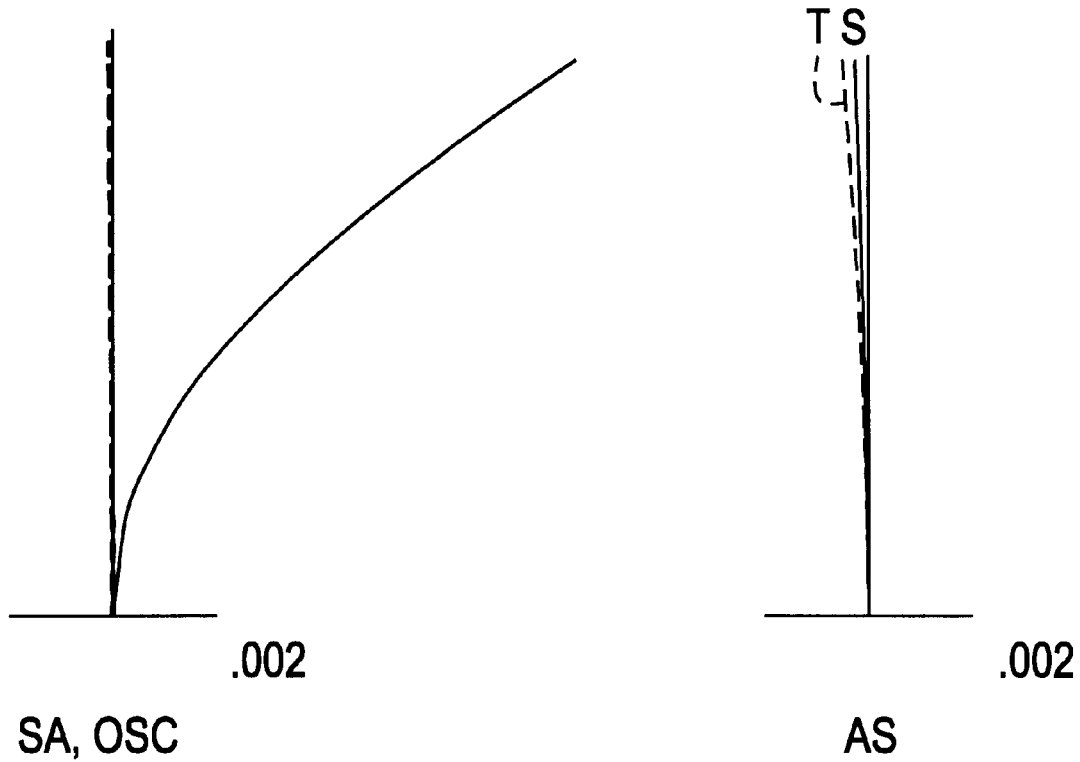

MULTIPLE FOCUS LENS, AN OPTICAL HEAD APPARATUS AND AN OPTICAL INFORMATION RECORDING-REPRODUCING APPARATUS

BACKGROUND OF THE INVENTION

This invention relates to an objective lens which is used for an optical head of an optical memory disk for a digital video disk, a digital audio disk, a computer and so on. This invention specifically relates to a multiple focus objective lens whose aberration is corrected toward plural kinds of substrates different from each other in thickness, an optical head apparatus provided with the lens, and an optical information recording-reproducing apparatus.

FIELD OF THE INVENTION

In a conventional optical head apparatus, a singlet having an aspheric surface has been often used as an objective lens. Such an objective lens is used to focus diffraction limited spots on an information medium in order to record and reproduce information. When the same objective lens is used with another disk of a different thickness from the first one, spheric aberration occurs because of the disk thickness difference. In order to solve this problem, differently designed objective lenses should be used for disks which are different in thickness. Namely, plural kinds of objective lenses should be prepared according to the kinds of substrate thicknesses when plural kinds of disks having different thicknesses are used for recording and reproducing with the same optical head.

Another reference has disclosed an objective lens having two focuses by using diffracting optics such as holograms (cf. KOMMA et al.: OPTICAL REVIEW Vol. 1, No. 1 (1994) lines 27–29). According to this reference, the objective lens is designed so that the aberration of the lens is corrected when 0th order diffracted light diffracted by the hologram transmits through the objective lens. With another disk which is thicker or thinner than the former one, the hologram is designed so that the aberration is corrected when +1st order diffracted light diffracted by the hologram transmits through the objective lens. The diffraction efficiency is designed so that the the ratio of the quantity of the 0th order diffracted light to the quantity of the +1st order diffracted light of the hologram is 1:1. Therefore, two focal points are created and the aberrations of the lens are corrected respectively toward disks which are different from each other in thickness.

It is generally known that coma occurs on axis when errors in manufacturing processes like decenters and tilts are found in the objective lens. The coma is corrected by tilting the objective lens and the hologram together at a certain angle toward the axis which is perpendicular to the disk. In the next step, the +1st order diffracted light diffracted by the hologram is focused by using disks of different thicknesses. The conditions for correction of the coma, however, are not the same as those of the former disk thickness. Therefore, the coma cannot be corrected.

SUMMARY OF THE INVENTION

In order to solve these and other problems, this invention aims to provide a multiple focus lens designed to substantially standardize the conditions for correction of coma for disks (recording media or substrates) which are different each other in thickness, an optical head apparatus and an optical information recording-reproducing apparatus in which the lenses are used.

For this purpose, a multiple focus lens of this invention comprises a diffracting means whose coma is corrected so that light beams having different diffraction orders will respectively focus on plural substrates having different thicknesses. The whole lens is tilted to correct its axial coma, and the tilt angles are substantially the same toward the substrates. When an optical head apparatus is assembled, the whole lens is tilted to correct its axial coma. If the tilt angles of the respective lenses are predetermined substantially the same toward plural information recording media (optical disks) having different substrate thicknesses, excellent focusing spots are obtained on plural information recording media by using one objective lens. Therefore, information can be recorded or reproduced with stabilized performance. Coma can occur on axis because of errors in the manufacturing process, and such aberrations should be corrected by tilting the whole objective lens. According to this invention, specifically, the correction angle is maintained at a certain value if the thickness of the disks is changed. Therefore, it is not necessary to re-adjust the tilt angle of the objective lens for each disk.

In the above-mentioned configuration, the 0th order diffracted light is focused on the information recording surface of a first substrate, while the +1st order diffracted light of the diffracting means is focused on the information recording surface of a second substrate whose thickness is different from that of the first substrate, so that the configuration meets the requirement of Formula (1).

$$L_1/(J_1+D_1) \approx L_2/(J_2+D_2) \tag{1}$$

$J_1$: off axis coma per unit angle toward the first substrate (m$\lambda$)

$J_2$: off axis coma per unit angle toward the second substrate (m$\lambda$)

$D_1$: coma per unit angle generated when the first substrate is tilted (m$\lambda$)

$D_2$: coma per unit angle generated when the second substrate is tilted (m$\lambda$)

$L_1$: axial coma of the lens toward the first substrate (m$\lambda$)

$L_2$: axial coma of the lens toward the second substrate (m$\lambda$)

The left side of Formula (1) indicates the tilt angle of the lens toward the first substrate, while the right side indicates the tilt angle of the lens toward the second substrate.

In the above formula, it is preferable that the 0th order diffracted light of the diffracting means is focused on the information recording surface of the first substrate, while the +1st order diffracted light of the diffracting means is focused on the information recording surface of the second substrate. It is also preferable that the residual coma ZC meets the requirement of Formula (2).

$$ZC = |L_1(J_2+D_2)/(J_1+D_1) - L_2| < 20 \tag{2}$$

$J_1$: off axis coma per unit angle toward the first substrate (m$\lambda$)

$J_2$: off axis coma per unit angle toward the second substrate (m$\lambda$)

$D_1$: coma per unit angle generated when the first substrate is tilted (m$\lambda$)

$D_2$: coma per unit angle generated when the second substrate is tilted (m$\lambda$)

$L_1$: axial coma of the lens toward the first substrate (m$\lambda$)

$L_2$: axial coma of the lens toward the second substrate (m$\lambda$)

The condition is set for the case in which certain degree of residual coma of a lens is permitted.

In the embodiments of this invention, two kinds of substrates of different in thickness are prepared, and 0th order diffracted light and +1st order diffracted light are used to focus toward the two substrates. The objective lens is a singlet having at least one aspheric surface, and the on axis coma of the objective lens is generated when the first surface and second surface of the lens are tilted 0.05° relative to each other. A diffracting grating as a phase grating can be integrated with the aspheric surface. Therefore, an objective lens which is light, has a longer working distance and superior diffraction efficiency is provided. If these lenses are glass-molded or resin-molded, they can be mass-produced at a low cost.

When the requirements of Formulas (3) to (5) are fulfilled, the chromatic aberration correcting function of the diffraction grating can be used. Therefore, an objective lens whose chromatic aberration is corrected without varying the focal position with change in wavelength is provided.

$$|fa^2(1/(fd \cdot Vd)+1/(fs \cdot Vs))|<0.0025 \quad (3)$$

$$Vs=(n\lambda-1)/(n\lambda(-)-n\lambda(+)) \quad (4)$$

$$Vd=\lambda/(\lambda(-)-\lambda(+)) \quad (5)$$

λ: the design wavelength

λ(+): a wavelength 10 nm longer than the design wavelength

λ(−): a wavelength 10 nm shorter than the design wavelength nλ: refractive index of lens in the design wavelength nλ(+): lens refractive index of the wavelength which is 10 nm longer than the design wavelength nλ(−): lens refractive index of the wavelength which is 10 nm shorter than the design wavelength fs: focal length of the lens defined by the 0th order diffracted light fd: focal length of the lens depending only on the diffracting means fa: focal length of the lens defined by the +1st order diffracted light According to an optical head apparatus and optical information recording-reproducing apparatus of this invention, the degrees of correction of the coma are substantially identical toward various thicknesses of the substrates. Therefore, skew adjustment for each substrate is not needed, and thus, optical heads and optical information recording-reproducing apparatus can be provided at a lower cost. Furthermore, it is possible to focus good spots without coma toward any substrates. As a result, the performance of recording, reproducing and erasing is excellent.

BRIEF DESCRIPTION OF THE DRAWINGS

FIGS. 7(a) and 7(b) show aberrations of a multiple focus lens of this invention toward the first disk of a third embodiment.

FIGS. 14(a) and 14(b) show aberrations of a multiple focus lens of this invention toward the second disk of the sixth embodiment.

DETAILED DESCRIPTION OF THE INVENTION

Figure 1:
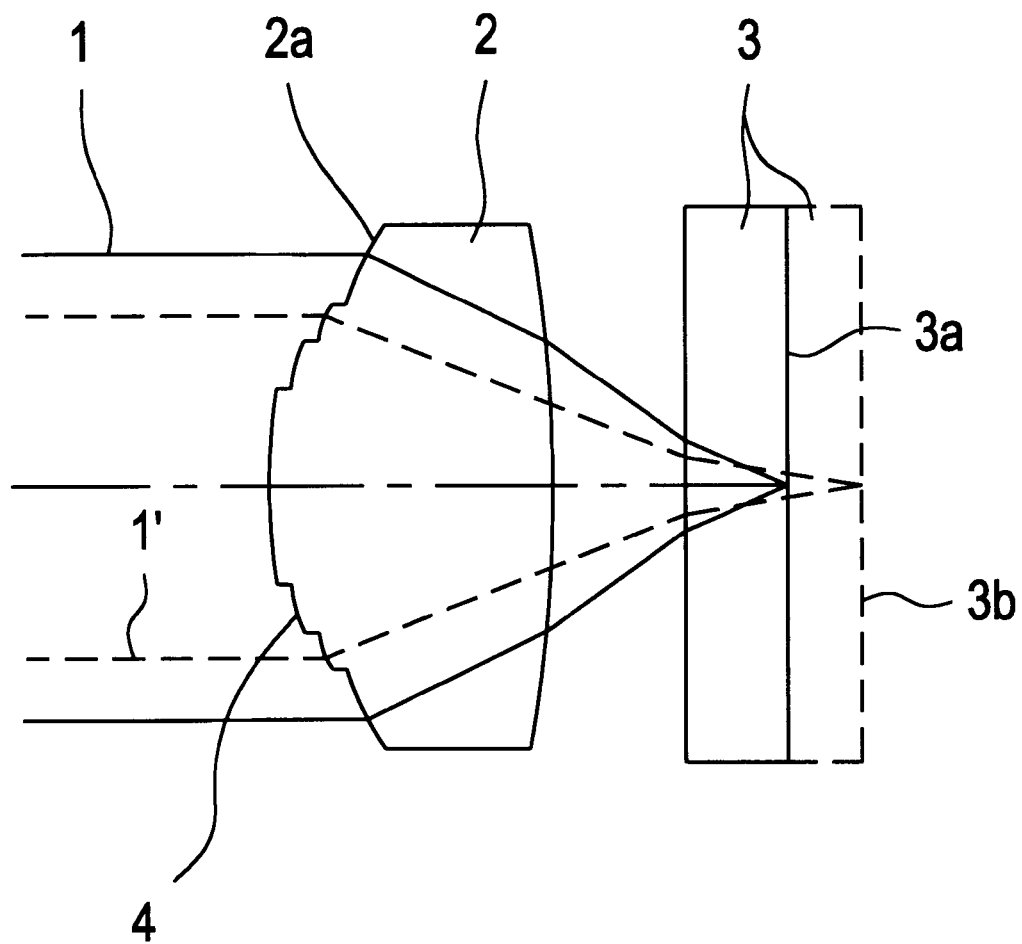
FIG. 1 shows a lens construction with optical paths according to one configuration of a multiple focus objective lens of this invention.

Multiple focus lenses of this invention are explained below, with reference to the drawings. FIG. 1 shows a lens construction with optical paths corresponding to the first through the fourth embodiments of the multiple focus lenses of this invention. In FIG. 1, incident 0th order light beam 1 enters an objective lens 2. The objective lens 2 is a bi-aspheric singlet. A phase grating 4 is formed on the incident-side surface 2a. The incident 0th order light beam 1 is focused on an information medium surface 3a of an disk 3. When the disk 3 is 1.2 mm thick, to form information medium surface 3b for example, the +1st order diffracted light beam 1' produced by passage through the phase grating 4 is used to bring the light to a focus on surface 3b. On the other hand, the 0th order diffracted light beam 1 is used when the disk 3 is 0.6 mm thick.

Figure 2:
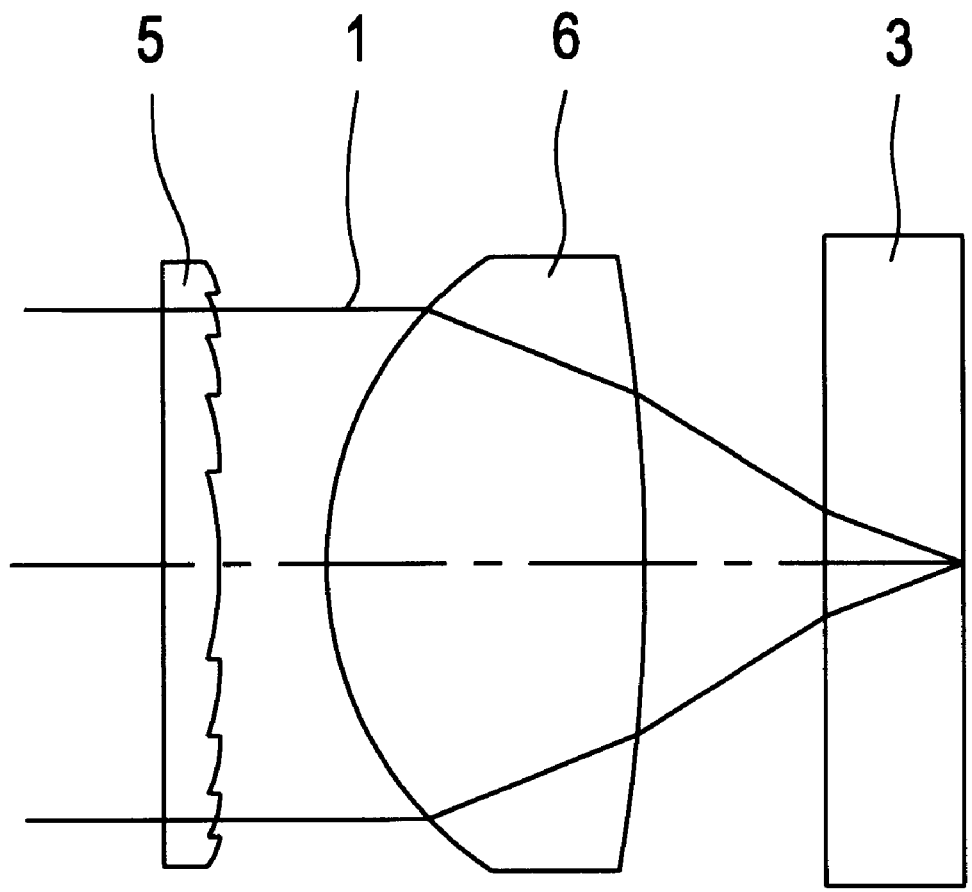
FIG. 2 shows a lens construction with optical paths according to another configuration of a multiple focus objective lens of this invention.

FIG. 2 shows the lens construction with optical paths of the fifth embodiment of a multiple focus lens of this invention. In FIG. 2, incident light 1 transmits through a plane substrate 5 on which a phase grating is formed, and later enters a bi-aspheric objective lens 6 and is focused on an information medium surface of an disk 3. Similar to the case shown in FIG. 1, +1st order diffracted light and 0th order diffracted light of the phase grating on the plane substrate 5 are transmitted through the disk 3 with having 1.2 mm thick and 0.6 mm thick.

Specific numerical values of the multiple focus lens of this invention are shown below. In every embodiment, the center wavelength for the lens design is 660 nm, the first disk thickness is 0.6 mm, the second disk thickness 1.2 mm, refractive index of the disks is 1.57815, numerical aperture (NA) toward the first disk is 0.60, numerical aperture (NA) toward the second disk is 0.43. In the following embodiments, the symbols shown in Table 1 are commonly used. The aspherical figures are expressed by Formula (6).

TABLE 1

$f_1$: focal length of objective lens toward the first disk
$f_2$: focal length of objective lens toward the second disk
fd: focal length of diffraction optics
$R_1$: radius of curvature of the first surface of the objective lens
$R_2$: radius of curvature of the second surface of the objective lens
d: thickness of the objective lens
n: refractive index of the objective lens
$WD_1$: working distance of the objective lens toward the first disk
$WD_2$: working distance of the objective lens toward the second disk $$X = \frac{C_j h^2}{1 + \{1 - (1 + CC_j)C_j^2 h^2\}^{1/2}} + \Sigma A_{jn} \quad (6)$$

X: distance from a tangential plane at the vertex of the aspherical surface to a point on the aspherical at a height h from the optical of the lens
between a point on aspheric face and contacting plane of aspherical face peak
h: height from the optical axis
$C_j$: curvature at the vertex of the j-th aspherical surface ($C_j = 1/R_j$)
CCj: conic constant of j-th surface of the objective lens
$A_{jn}$: aspheric surface coefficient of n-th order of j-th surface of the objective lens In Formula (6), j≠1,2.

The phase grating is produced by using the super-high refractive index method (cf. "Describing holographic optical apparatuses as lenses" in 'Journal of Optical Society of America', Vol.67, No. 6, June 1977 by William C. Sweatt). The aspheric surface having a phase grating is indicated by Formula (6) similarly to a normal aspheric lens. The symbols are defined as indicated in Table 2. Parameter showing the performance of a lens are also defined in Table 3.

TABLE 2

Cd: curvature at the vertex of aspheric surface having phase grating (Cd=1/Rd)
CCd: conical constant of aspheric surface having phase grating
Adn: aspheric surface coefficient of n-th order having phase grating
nd: super-high refractive index indicating phase grating
dd: interval between phase grating and first surface of objective lens

TABLE 3

$J_1$: coma at 1° off-axis toward the first disk (mλ)
$J_2$: coma at 1° off-axis toward the second disk (mλ)

$D_1$: coma generated when the first disk is tilted at 1° (mλ)
$D_2$: coma generated when the second disk is tilted at 1° (mλ)
$L_1$: coma generated when the first surface and second surface of the objective lens which is used for the first disk are tilted each other at 0.05°
$L_2$: coma generated when the first surface and second surface of the objective lens which is used for the second disk are tilted each other at 0.05°
$A_1$: lens tilt angle which is required to correct coma $L_1$ the lens has toward the first disk (degree)
$A_2$: lens tilt angle which is required to correct coma $L_2$ has toward the second disk (degree)
DA: difference between the skew angles used to correct the coma of the first and second disks
ZC: residual coma toward the second disk after the objective lens is skew-adjusted toward the first disk The difference of skew angles (DA) and the residual coma (ZC) are defined with Formulas (7) and (8).

$$DA = \frac{L_1(J_2 + D_2) - L_2(J_1 + D_1)}{(J_1 + D_1) \cdot (J_2 + D_2)} \quad (7)$$

$$ZC = |L_1(J_2 + D_2)/(J_1 + D_1) - L_2| \quad (8)$$

In the fourth and sixth embodiments, values shown in the following Table 4 are also described.

TABLE 4

$Vs: Vs=(n\lambda-1)/(n\lambda(-)-n\lambda(+))$ $Vd: Vd=\lambda/(\lambda(-)-\lambda(30))$ $fa^2(1/(fd \cdot Vd)+1/(fs \cdot Vs))$ λ: design wavelength
λ(+): a wavelength 10 nm longer than the design wavelength
λ(−): a wavelength 10 nm shorter than the design wavelength
nλ: refractive index of lens for the design wavelength
nλ(+): refractive index of a lens for a wavelength which is 10 nm longer than the design wavelength
nλ(−): refractive index of a lens for a wavelength which is 10 nm shorter than the design wavelength
fs: focal length of the lens defined by the 0th order diffracted light
fd: focal length of the lens only by diffracting means
fa: focal length of the lens defined by the +1st order diffracted light

THE FIRST EMBODIMENT

Figure 3A:
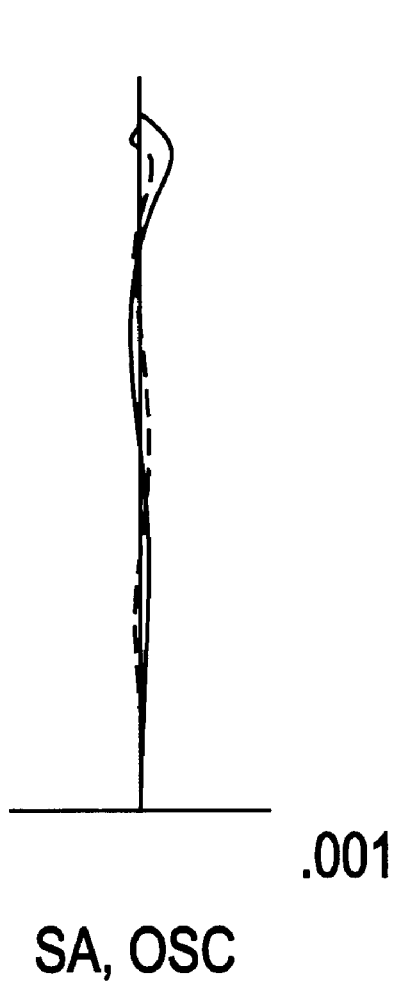
FIGS. 3(a) and 3(b) show aberrations of a multiple focus lens of this invention toward the first disk of a first embodiment.
Figure 3B:
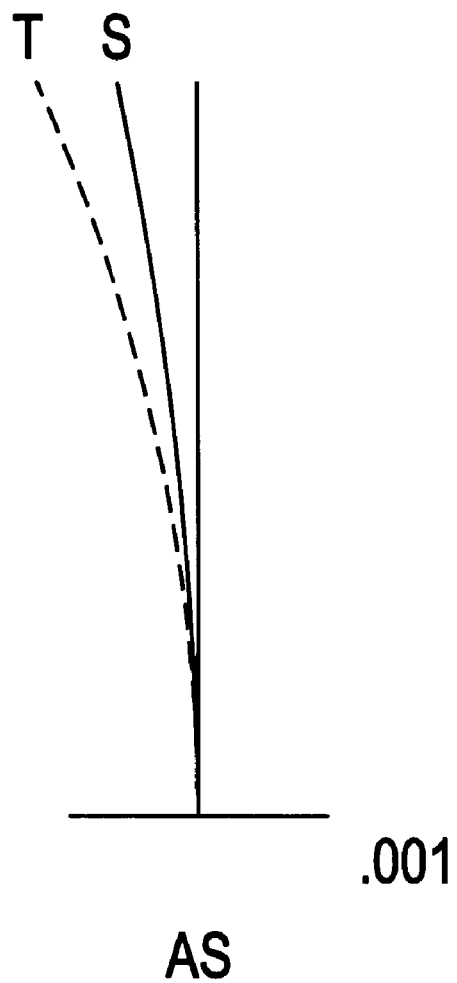
Figure 4A:
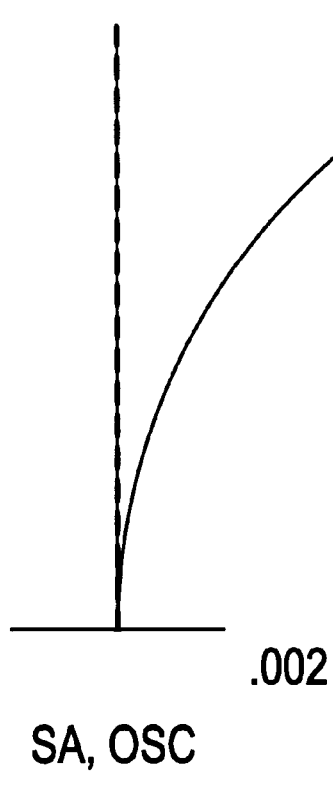
FIGS. 4(a) and 4(b) show aberrations of a multiple focus lens of this invention toward the second disk of the first embodiment.
Figure 4B:
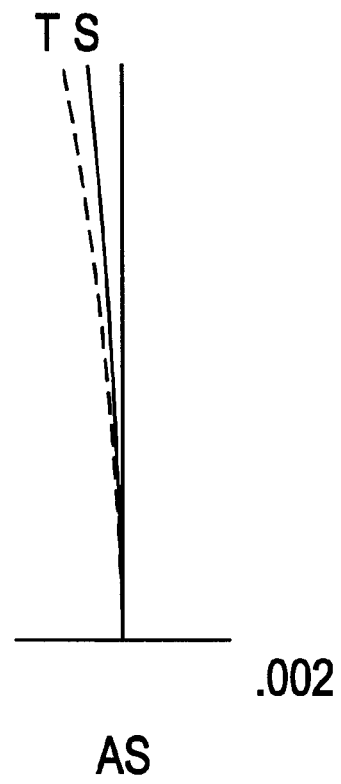

Table 5 shows specific values for the first embodiment. In this embodiment, a phase grating is formed on the incident side (the first surface) of a bi-aspheric objective lens. In this configuration, the 0th order diffracted light of the phase grating is used for the first disk while the +1st order diffracted light is used for the second disk. The parameters for the phase grating are shown in Table 6. Parameters of the lens performance are shown in Table 7. As shown in Table 7, the residual coma ZC is as small as 3.35 mλ. The residual coma means the coma generated for the second disk after the lens is skew-adjusted for the first disk until the coma is completely corrected. FIGS. 3(a) and 3(b) show the aberration toward the first disk of this embodiment, and FIGS. 4(a) and 4(b) show the aberration toward the second disk. In FIG. 3(a) to FIG. 14(a), dotted lines indicate spherical aberrations and solid lines indicate sine conditions. In FIG. 3(b) to FIG. 14(b), dotted lines indicate astigmatism in the tangential direction, and solid lines indicate astigmatism in the sagittal direction.

TABLE 5

$f_1=3.300$
$f_2=3.470$
$fd=-63.55$
$R_1=2.1558086$
$R_2=-12.3141$
$d=1.95$
$n=1.58505$
$WD_1=1.818$
$WD_2=1.618$
$CC_1=-0.5831234$
$A1_4=0.1096160\times10^{-2}$
$A1_6=0.7696830\times10^{-4}$
$A1_8=-0.3096378\times10^{-5}$
$A1_{10}=-0.2498079\times10^{-5}$
$A1_{12}=-0.5937861\times10^{-6}$
$A1_{14}=-0.1236822\times10^{-6}$
$A1_{16}=-0.2874145\times10^{-7}$
$A1_{18}=-0.7880838\times10^{-8}$
$CC_2=-0.6148647\times10^{+2}$
$A2_4=0.5599796\times10^{-2}$
$A2_6=-0.1096351\times10^{-2}$
$A2_8=0.1248956\times10^{-4}$
$A2_{10}=-0.4164452\times10^{-5}$
$A2_{12}=-0.1063211\times10^{-5}$
$A2_{14}=-0.2827017\times10^{-6}$
$A2_{16}=-0.1185695\times10^{-7}$
$A2_{18}=0.3290121\times10^{-7}$

TABLE 6

$Rd=2.1558197$
$dd=0$
$CCd=-0.5831211$
$Ad_4=0.1096087\times10^{-2}$
$Ad_6=0.7696634\times10^{-4}$
$Ad_8=-0.3096928\times10^{-5}$
$Ad_{10}=-0.2497977\times10^{-5}$
$Ad_{12}=-0.5937990\times10^{-6}$
$Ad_{14}=-0.1236881\times10^{-6}$
$Ad_{16}=-0.2874025\times10^{-7}$
$Ad_{18}=-0.7879282\times10^{-8}$
$nd=6601$

TABLE 7

$J_1=1.9$
$J_2=35.0$
$D_1=-100.1$
$D_2=-65.6$
$L_1=-58.9$
$L_2=-21.7$
$A_1=0.60$
$A_2=0.71$
$DA=-0.11$
$ZC=3.35$

THE SECOND EMBODIMENT

Figure 5A:
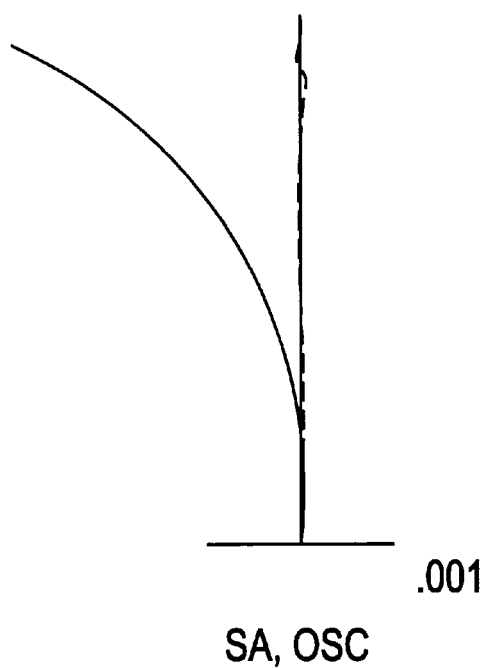
FIGS. 5(a) and 5(b) show aberrations of a multiple focus lens of this invention toward the first disk of a second embodiment.
Figure 5B:
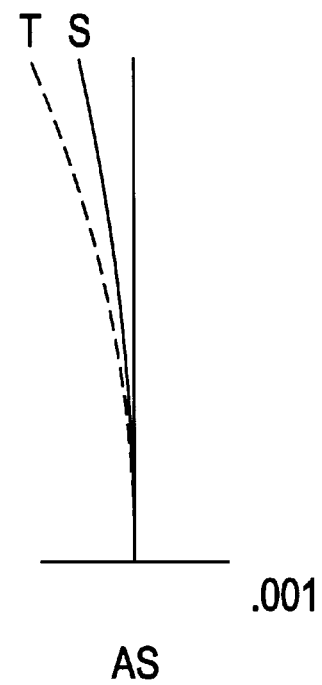
Figure 6A:
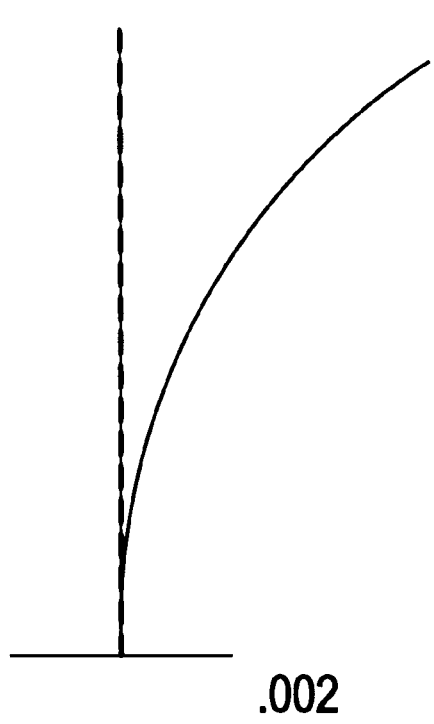
FIGS. 6(a) and 6(b) show aberrations of a multiple focus lens of this invention toward the second disk of the second embodiment.
Figure 6B:
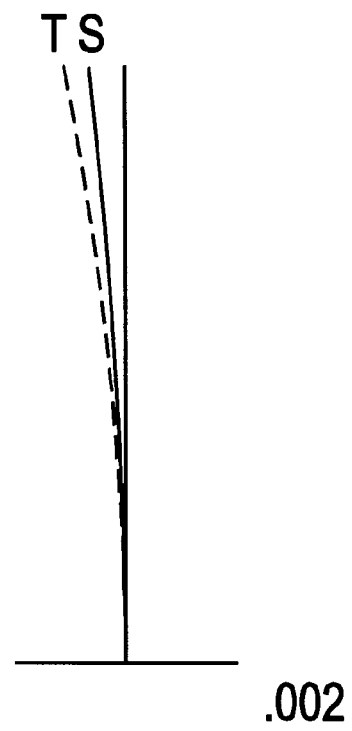

Table 8 shows specific values of the second embodiment. In this embodiment, a phase grating is formed on the incident side (the first surface) of a bi-aspheric objective lens. In this configuration, the 0th order diffracted light of the phase grating is used for the first disk while the +1st order diffracted light is used for the second disk. Parameters for the phase grating are shown in Table 9. Parameters for the lens performance are shown in Table 10. As shown in Table 10, the residual coma ZC is as small as 2.82 mλ. In this embodiment, the off-axis comas of the first and second disks are in balance. As a result, the off-axis performance of the objective lens does not deteriorate regardless of the disk thickness. FIGS. 5(a) and 5(b) show the aberration toward the first disk of this embodiment, and FIGS. 6(a) and 6(b) show the aberration toward the second disk.

TABLE 8

$f_1=3.300$
$f_2=3.466$
$fd=-64.83$
$R_1=2.1558086$
$R_2=-12.3141$
$d=1.95$
$n=1.58505$
$WD_1=1.818$
$WD_2=1.614$
$CC_1=-0.5799059$
$A1_4=0.1145763\times10^{-2}$
$A1_6=0.9992302\times10^{-4}$
$A1_8=0.4690929\times10^{-5}$
$A1_{10}=-0.5053259\times10^{-6}$
$A1_{12}=0.4115106\times10^{-8}$
$A1_{14}=0.3700554\times10^{-7}$
$A1_{16}=0.2946913\times10^{-8}$
$A1_{18}=-0.5026041\times10^{-8}$
$CC_2=-0.6701698\times10^{+2}$
$A2_4=0.5706935\times10^{-2}$
$A2_6=-0.9821985\times10^{-3}$
$A2_8=0.8621557\times10^{-4}$
$A2_{10}=0.7490003\times10^{-5}$
$A2_{12}=-0.1187188\times10^{-5}$
$A2_{14}=-0.8258067\times10^{-6}$
$A2_{16}=-0.1263532\times10^{-6}$
$A2_{18}=0.6446279\times10^{-7}$

TABLE 9

$Rd=2.1558195$
$dd=0$
$CCd=-0.5831211$
$Ad_4=0.1145736\times10^{-2}$
$Ad_6=0.9992439\times10^{-4}$
$Ad_8=0.4691058\times10^{-5}$ $Ad_{10}=-0.5053310\times10^{-6}$
$Ad_{12}=0.4115163\times10^{-8}$
$Ad_{14}=0.3700600\times10^{-7}$
$Ad_{16}=0.2946752\times10^{-8}$
$Ad_{18}=-0.5025686\times10^{-8}$
nd=6601

TABLE 10

$J_1=-20.8$
$J_2=28.1$
$D_1=-99.0$
$D_2=-64.9$
$L_1=-62.1$
$L_2=-21.9$
$A_1=0.52$
$A_2=0.60$
DA=-0.08
ZC=2.82

THE THIRD EMBODIMENT

Figure 8A:
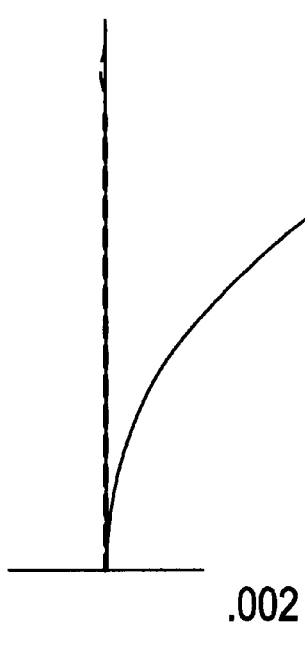
FIGS. 8(a) and 8(b) show aberrations of a multiple focus lens of this invention toward the second disk of the third embodiment.
Figure 8B:
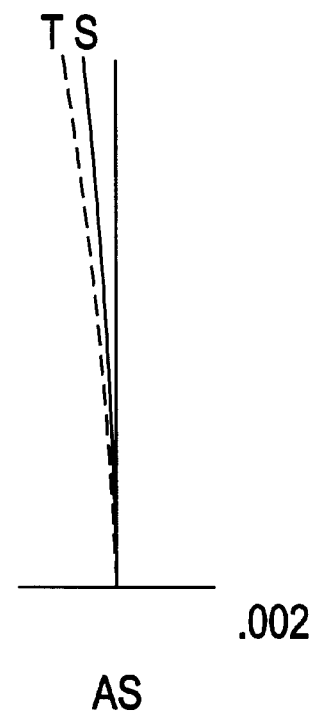

Table 11 shows the specific values of the third embodiment. In this embodiment, a phase grating is formed on the incident side (the first surface) of a bi-aspheric objective lens. In this configuration, the 0th order diffracted light of the phase grating is used for the first disk while the +1st order diffracted light is used for the second disk. Parameters for the phase grating are shown in Table 12. Parameters for the lens performance are shown in Table 13. As shown in Table 13, the residual coma ZC is as small as 14.5 mλ. In this embodiment, the difference between the focusing position of the first disk and that of the second disk is determined to be 0.47 mm. As a result, this configuration is merely influenced by diffracted light other than the 0th and +1st order diffracted light, for example, stray light including +2nd order diffracted light or -1st order diffracted light. FIGS. 7(a) and 7(b) show the aberration toward the first disk of this embodiment, and FIGS. 8(a) and 8(b) show the aberration toward the second disk.

TABLE 11

$f_1=3.300$
$f_2=3.536$
fd=-46.64
$R_1=2.1400000$
$R_2=-13.0643$
d=1.96
n=1.58505
$WD_1=1.804$
$WD_2=1.674$
$CC_1=-0.6688580$
$A1_4=0.2167700\times10^{-2}$
$A1_6=0.1006760\times10^{-3}$
$A1_8=-0.2885640\times10^{-6}$
$A1_{10}=-0.7414980\times10^{-5}$
$CC_2=-0.8244420\times10^{+2}$
$A2_4=0.4438020\times10^{-2}$
$A2_6=-0.1404200\times10^{-2}$
$A2_8=0.1666000\times10^{-3}$
$A2_{10}=-0.5929770\times10^{-5}$

TABLE 12

Rd=2.140014877
dd=0
CCd=-0.6688598
$Ad_4=0.2167624\times10^{-2}$
$Ad_6=0.1006697\times10^{-3}$
$Ad_8=-0.2873216\times10^{-6}$
$Ad_{10}=-0.7416493\times10^{-5}$
$Ad_{12}=0.7821931\times10^{-9}$
$Ad_{14}=-0.1110520\times10^{-9}$
nd=6601

TABLE 13

$J_1=8.4$
$J_2=53.9$
$D_1=-100.3$
$D_2=-66.4$
$L_1=-58.9$
$L_2=-22.5$
$A_1=0.64$
$A_2=1.80$
DA=-1.16
ZC=14.49

THE FOURTH EMBODIMENT

Table 14 shows the specific values of the fourth embodiment. In this embodiment, a phase grating is formed on the incident side (the first surface) of a bi-aspheric objective lens. In this configuration, the 0th order diffracted light of the phase grating is used for the first disk while the +1st order diffracted light is used for the second disk. Parameters for the phase grating are shown in Table 15. Parameters for the lens performance are shown in Table 16. As shown in Table 16, the residual coma ZC is as small as 5.08 mλ.

Figure 9A:
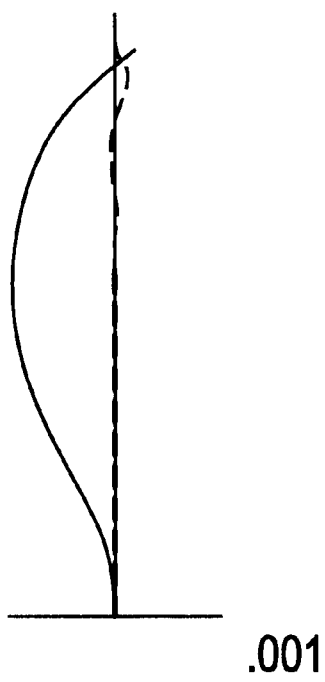
FIGS. 9(a) and 9(b) show aberrations of a multiple focus lens of this invention toward the first disk of a fourth embodiment.
Figure 9B:
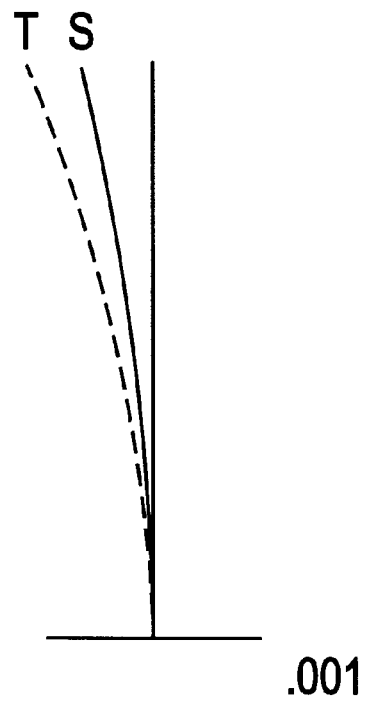
Figure 10A:
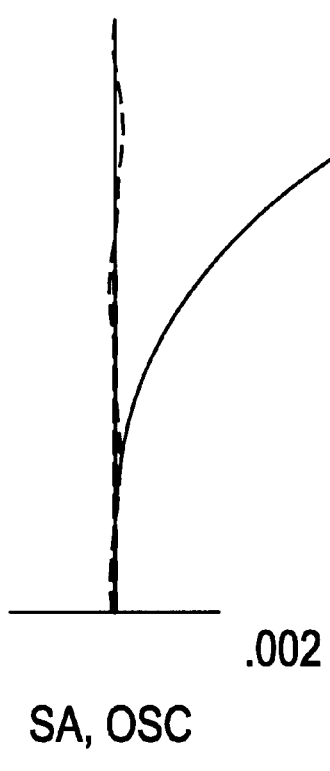
FIGS. 10(a) and 10(b) show aberrations of a multiple focus lens of this invention toward the second disk of the fourth embodiment.
Figure 10B:
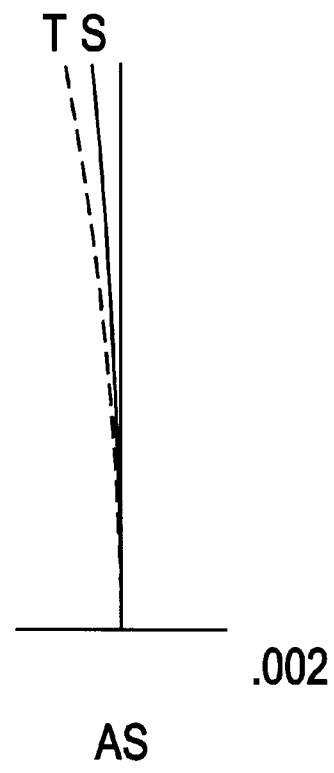

In this embodiment, the diffracting optics are provided with positive power. Therefore, the chromatic aberration of the lens can be corrected by combining it with refractive elements. As for an erasable optical disk, light output of a semiconductor laser considerably varies at reproduction and at writing, and thus, the wavelength changes. In order to solve such a problem, the chromatic aberration toward the first disk which uses the diffracted light is determined to be zero near the employed wavelength. As a result, a lens without focal shift toward the wavelength variation of the semiconductor laser can be provided. FIGS. 9(a) and 9(b) show the aberration toward the first disk of this embodiment, and FIGS. 10(a) and 10(b) show the aberration toward the second disk.

TABLE 14

$f_1=3.125$
$f_2=3.300$
fd=51.83
$R_1=2.3647415$
$R_2=-30.8132$
d=2.00
n=1.68219
$WD_1=1.608$
$WD_2=1.408$
$CC_1=-0.5793103$ $A1_4=0.1716761\times10^{-2}$
$A1_6=-0.2394857\times10^{-3}$
$A1_8=-0.1126859\times10^{-5}$
$A1_{10}=-0.2943749\times10^{-5}$
$A1_{12}=-0.1771332\times10^{-5}$
$A1_{14}=-0.4725185\times10^{-6}$
$A1_{16}=-0.7873098\times10^{-7}$
$A1_{18}=-0.3364102\times10^{-8}$
$CC_2=-0.1723754\times10^{+4}$
$A2_4=0.4322907\times10^{-3}$
$A2_6=-0.6731402\times10^{-3}$
$A2_8=-0.1744171\times10^{-3}$
$A2_{10}=0.2295241\times10^{-4}$
$A2_{12}=-0.1377768\times10^{-5}$
$A2_{14}=0.2275220\times10^{-6}$
$A2_{16}=0.1627804\times10^{-6}$
$A2_{18}=0.6362121\times10^{-7}$

TABLE 15

Rd=2.3647252
dd=0
CCd=-0.5793877
$Ad_4=0.1716582\times10^{-2}$
$Ad_6=0.2394999\times10^{-3}$
$Ad_8=-0.1125483\times10^{-5}$
$Ad_{10}=-0.2945767\times10^{-5}$
$Ad_{12}=-0.1771131\times10^{-5}$
$Ad_{14}=-0.4724719\times10^{-6}$
$Ad_{16}=-0.7874497\times10^{-7}$
$Ad_{18}=-0.3364664\times10^{-8}$
nd=6601

TABLE 16

$J_1$=7.8
$J_2$=41.5
$D_1$=-100.0
$D_2$=-65.8
$L_1$=-42.2
$L_2$=-16.2
$A_1$=0.46
$A_2$=0.67
DA=-0.21
ZC=5.08
Vs=440.98
Vd=-33
$fa^2(1/(fd\cdot Vd)+1/(fs\cdot Vs))=0.001$

THE FIFTH EMBODIMENT

Figure 11A:
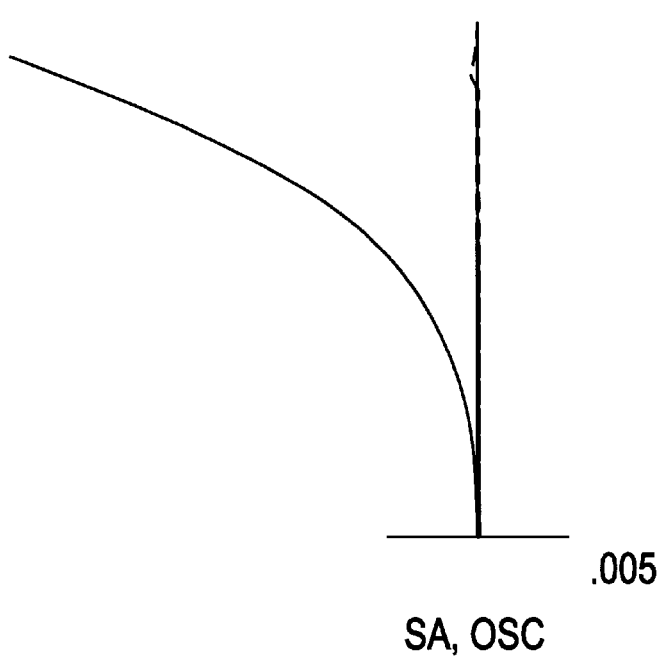
FIGS. 11(a) and 11(b) show aberrations of a multiple focus lens of this invention toward the first disk of a fifth embodiment.
Figure 11B:
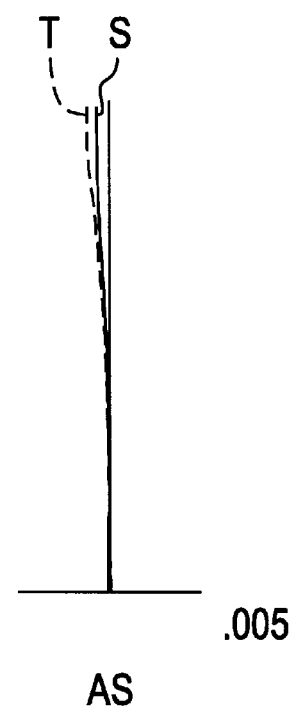
Figure 12A:
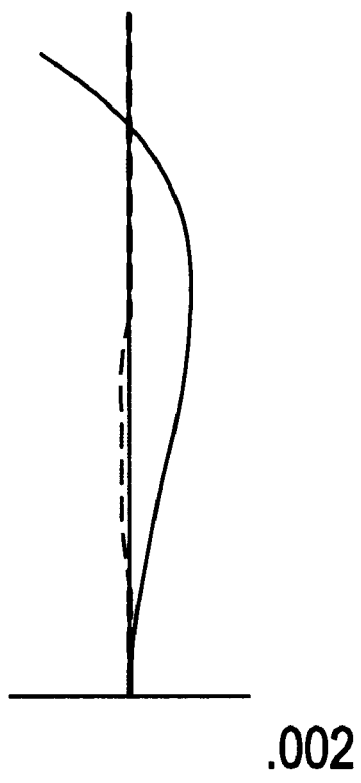
FIGS. 12(a) and 12(b) show aberrations of a multiple focus lens of this invention toward the second disk of the fifth embodiment.
Figure 12B:
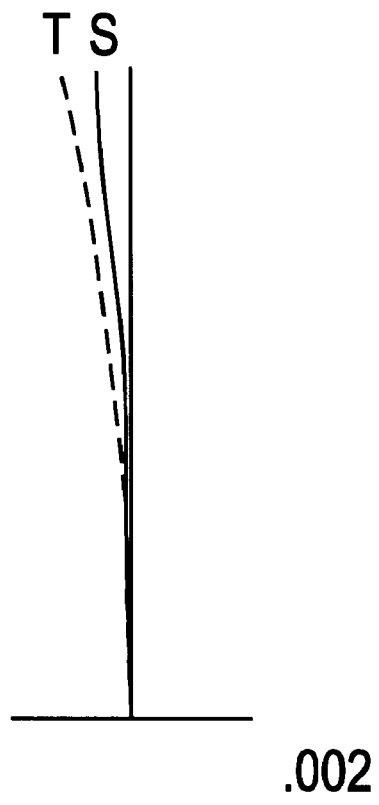

Table 17 shows the specific values according to this embodiment. In the fifth embodiment, a phase grating is formed on the second side of a plane substrate, not on the objective lens (cf. FIG. 2). In this configuration, the 0th order diffracted light of the phase grating is used for the first disk while the +1st order diffracted light is used for the second disk. Parameters for the phase grating are shown in Table 18. The thickness of the plane substrate and the refractive index are not described here, since the parallel incident light does not substantially influence the design. Parameters of the lens performance are shown in Table 19. As shown in Table 19, the residual coma ZC is as small as 5.69 mλ. FIGS. 11(a) and 11(b) show the aberration toward the first disk of this embodiment, and FIGS. 12(a) and 12(b) show the aberration toward the second disk.

TABLE 17

$f_1$=3.300
$f_2$=3.192
fd=-57.95
$R_1$=2.235159
$R_2$=-9.4913
d=2.0
n=1.58505
$WD_1$=1.830
$WD_2$=1.631
$CC_1$=-0.5937478
$A1_4=0.5858212\times10^{-3}$
$A1_6=0.7802548\times10^{-4}$
$A1_8=0.3114840\times10^{-4}$
$A1_{10}=0.3927729\times10^{-5}$
$A1_{12}=0.5753915\times10^{-6}$
$A1_{14}=0.1415412\times10^{-6}$
$A1_{16}=0.3625273\times10^{-7}$
$A1_{18}=0.7264171\times10^{-8}$
$CC_2=-0.2269465\times10^{+2}$
$A2_4=0.6356839\times10^{-2}$
$A2_6=-0.4802380\times10^{-3}$
$A2_8=0.1380802\times10^{-3}$
$A2_{10}=0.1620924\times10^{-4}$
$A2_{12}=0.1551148\times10^{-5}$
$A2_{14}=-0.8947881\times10^{-7}$
$A2_{16}=-0.5750018\times10^{-7}$
$A2_{18}=-0.1026666\times10^{-7}$

TABLE 18

Rd=2382500.0
dd=5
CCd=0.0
$Ad_4=-0.7433126\times10^{-8}$
$Ad_6=-0.5174579\times10^{-8}$
nd=6601

TABLE 19

$J_1$=-176.9
$J_2$=-12.3
$D_1$=-92.0
$D_2$=-63.5
$L_1$=-63.9
$L_2$=-23.7
$A_1$=0.24
$A_2$=0.31
DA=-0.08
ZC=5.69

THE SIXTH EMBODIMENT

Table 20 shows the specific values of the sixth embodiment. In this embodiment, a phase grating is formed on the incident side (the first surface) of a bi-aspheric objective lens. In this configuration, the 0th order diffracted light of the phase grating is used for the first disk while the +1st order diffracted light is used for the second disk. Parameters for the phase grating are shown in Table 21. Parameters of the lens performance are shown in Table 22. As shown in Table 22, the residual coma ZC is as small as 7.8 m$\lambda$.

Figure 13A:
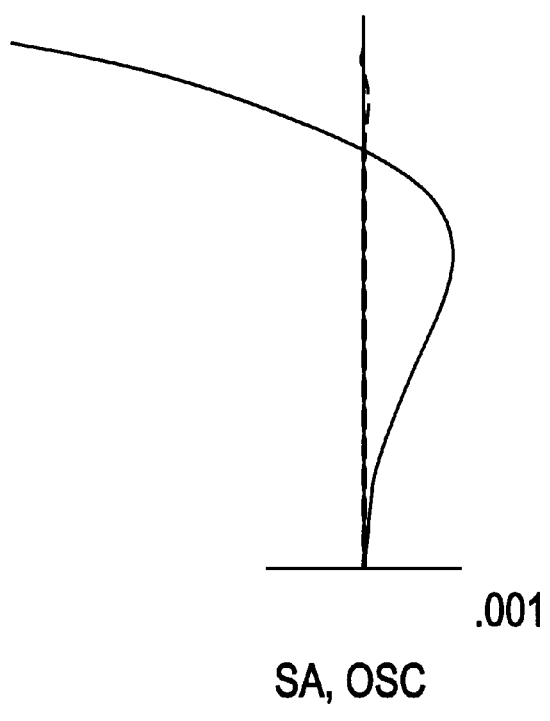
FIGS. 13(a) and 13(b) show aberrations of a multiple focus lens of this invention toward the first disk of a sixth embodiment.
Figure 13B:
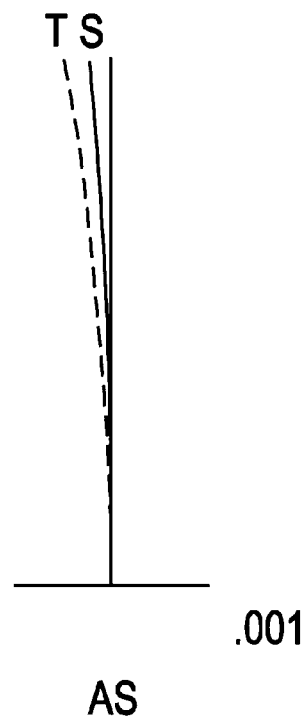

In this embodiment, the diffracting optics are provided with positive power. Therefore, the chromatic aberration of the lens can be corrected by combining it with refractive elements. As for an erasable optical disk, light output of a semiconductor laser considerably varies at reproduction and at writing, and thus, the wavelength changes. In order to solve such a problem, the chromatic aberration toward the first disk which uses the diffracted light is determined to be zero near the employed wavelength. As a result, a lens without focal shift toward the wavelength variation of the semiconductor laser can be provided. In this embodiment, the performance deterioration which occurs when the first and second surfaces of a lens decenter is controlled as much as possible. Such a lens is easily produced since the manufacturing tolerance is relaxed. FIGS. 13(a) and 13(b) show the aberration toward the first disk of this embodiment, and FIGS. 14(a) and 14(b) show the aberration toward the second disk.

TABLE 20

$f_1$=3.300
$f_2$=3.478
fd=63.47
$R_1$=2.42
$R_2$=−72.94026
d=1.92
n=1.68039
$WD_1$=1.800
$WD_2$=1.601
$CC_1$=−0.5073552
$A1_4$=0.6334136×10$^{-3}$
$A1_6$=−0.7720862×10$^{-4}$
$A1_8$=0.1135758×10$^{-4}$
$A1_{10}$32 0.9083080×10$^{-6}$
$A1_{12}$=−0.4623212×10$^{-6}$
$A1_{14}$=−0.1316056×10$^{-6}$
$A1_{16}$=0.6379332×10$^{-8}$
$CC_2$=−0.8242913×10$^{+4}$
$A2_4$=0.1045507×10$^{-2}$
$A2_6$=0.8918325×10$^{-4}$
$A2_8$=−0.2597592×10$^{-4}$
$A2_{10}$=−0.8378008×10$^{-5}$
$A2_{12}$=−0.1866804×10$^{-5}$
$A2_{14}$=−0.2319459×10$^{-6}$
$A2_{16}$=0.2351476×10$^{-6}$

TABLE 21

Rd=2.3647252
dd=0
CCd=−0.5073543
$Ad_4$=0.6334323×10$^{-3}$
$Ad_6$=−0.7721048×10$^{-4}$
$Ad_8$=0.1135705×10$^{-4}$
$Ad_{10}$=0.9082609×10$^{-6}$
$Ad_{12}$=−0.4623206×10$^{-6}$
$Ad_{14}$=−0.1316054×10$^{-6}$
$Ad_{16}$=0.6378943×10$^{-8}$
$Ad_{18}$=−0.8428809×10$^{-13}$
nd=6601

TABLE 22

$J_1$=−33.5
$J_2$=42.4
$D_1$=−98.3
$D_2$=−65.7
$L_1$=−54.9
$L_2$=−17.5
$A_1$=0.42
$A_2$=0.75
DA=−0.33
ZC=7.8
Vs=439.81
Vd=−33
$fa^2(1/(fd \cdot Vd)+1/(fs \cdot Vs))$=0.00228

The objective lens explained in the above embodiments is preferably glass-molded or resin-molded. In other words, it is possible to mass-produce lenses having identical shapes and identical performance at a lower cost, by processing the diffraction grating on a mold. It is also preferable that the diffraction grating on the plane substrate shown in the fifth embodiment is similarly glass-molded or resin-molded.

Figure 15:
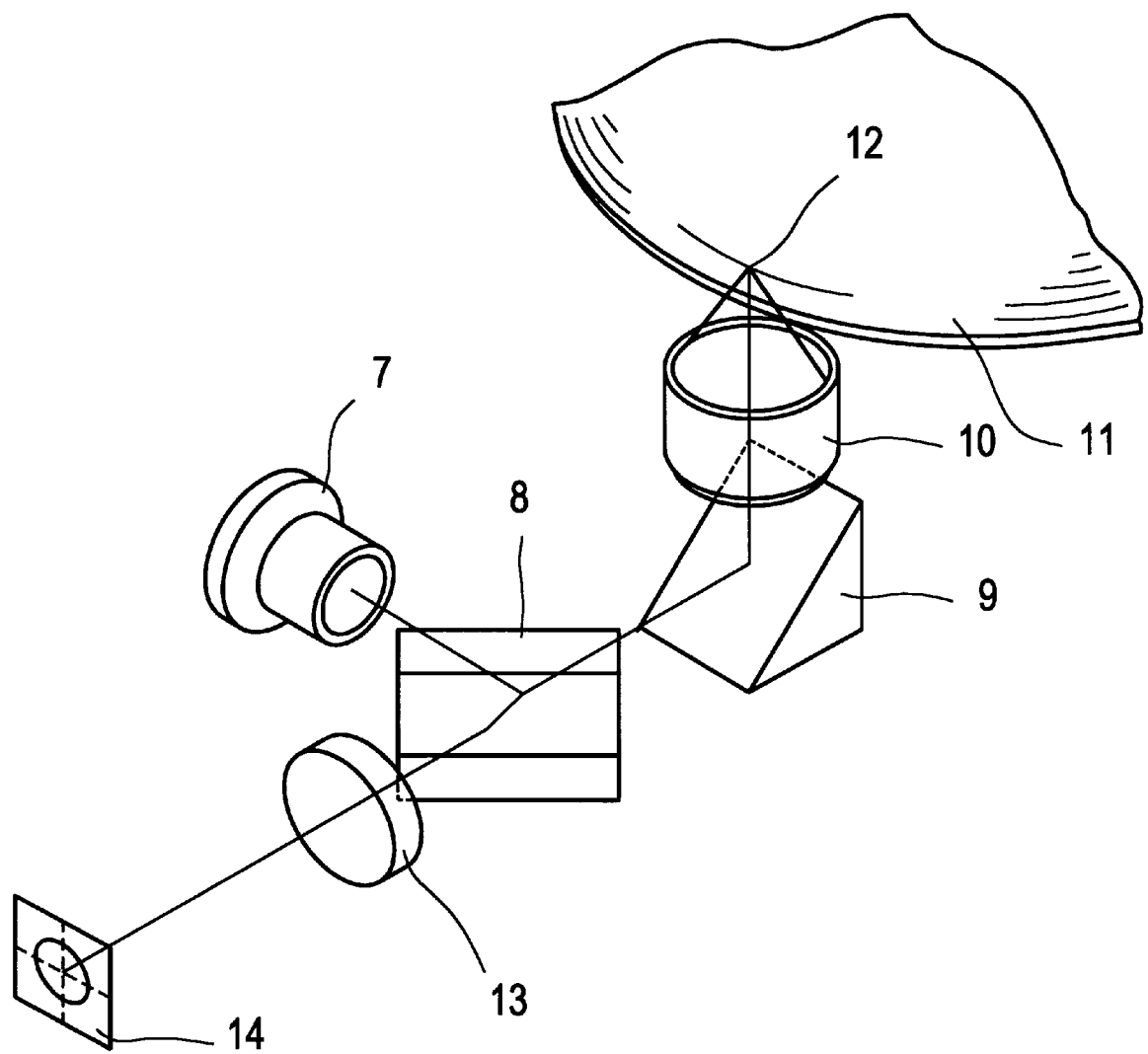
FIG. 15 is a perspective view showing the configuration of one embodiment of an optical head apparatus and an optical information recording-reproducing apparatus according to this invention.

FIG. 15 shows the configuration of an optical head apparatus using a multiple focusing objective lens of this invention, and an optical information recording-reproducing apparatus. In FIG. 15, a light beam radiated from a semiconductor laser 7 is reflected by a half mirror 8. The direction of the optical path is changed by a mirror 9, and focused on an information medium surface 12 of a disk 11 by an objective lens 10. The objective lens 10 has the structure shown in FIG. 1 or FIG. 2, and it focuses either 0th order diffracted light or +1st order diffracted light from the phase grating toward the disk 11. The focusing spot is diffracted by pits formed on the information medium surface 12. The laser light beam which is reflected and diffracted by the information medium surface 12 transmits through the half mirror 8, and focused on a photodetector 14 by an detecting lens 13. Data are read by detecting the variation of light quantity modulated on the information medium surface 12 by using electric signals from the photodetector 14.

The objective lens 10 can have coma due to errors in processing. In such a case, the coma is corrected by tilting the optical axis of the objective lens 10 toward the optical axis of the disk 11. In the next step, the disk 11 is replaced by another disk different in thickness, so that either the 0th or the +1st order diffracted light which is not focused on the disk 11 is focused on the other disk. The objective lens 10 has the performance shown in the first to the fifth embodiments, so the coma substantially does not occur even if the substrate thickness varies. As a result, the skew adjustment need not be varied for every substrate thickness, and signals can always be recorded and reproduced with good spot focusing conditions. In addition, optical recording-reproducing apparatuses which can record and reproduce in a good condition are obtained by recording and reproducing the optical disk media varied in substrate thickness, by using the multiple focus objective lens or the optical head apparatus of this invention.

Though parallel light enters an objective lens for an optical disk in every embodiment mentioned above, other methods can also be used. For example, light from a semiconductor laser is focused directly by one lens. Otherwise, the objective lens can be replaced by a finite magnification lens to disperse or converge light without it being made parallel by a collimating lens. The objective lenses for optical disks are not limited to bi-aspheric singlets. A lens which has one aspheric surface, a bi-spheric lens or a combination of such lenses can be used.

In the fifth embodiment, the phase grating is formed on a plane substrate. The phase grating can also be formed on a spherical or aspherical surface. The hologram can be located at the incident side or at the radiating side. Furthermore, the order of the diffracted light is not limited to the 0th and the +1st order light, but −1st order diffracted light and +2nd order diffracted light are also available. In addition, diffracted light of at least three kind of orders can be used to reproduce data on at least three kinds of substrates of different thickness. A diffraction grating can be formed on either the front or the rear of an objective lens and be integrated with the lens.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A multiple focus objective lens comprising at least one lens and a diffracting means for focusing light on a surface and whose aberration is corrected so that light beams having various diffracting orders focus respectively on plural substrates of different thickness, the lens being tilted to correct axial coma of the lens towards said plural substrates, the tilt angles of said lens with respect to said substrates being substantially the same.

2. The multiple focus objective lens according to claim 1, which focuses 0th order diffracted light diffracted by said diffracting means on an information recording surface of a first substrate and focuses +1st order diffracted light diffracted by said diffracting means on an information recording surface of a second substrate which is different in thickness from said first substrate, and meets the requirement, $$L_1/(J_1+D_1) \neq L_2/(J_2+D_2)$$

where $J_1$: off axis coma per unit angle toward the first substrate (mλ)

$J_2$: off axis coma per unit angle toward the second substrate (mλ)

$D_1$: coma per unit angle generated when the first substrate is tilted (mλ)

$D_2$: coma per unit angle generated when the second substrate is tilted (mλ)

$L_1$: axial coma of the lens toward the first substrate (mλ)

$L_2$: axial coma of the lens toward the second substrate (mλ).

3. The multiple focus objective lens according to claim 1, which focuses 0th order diffracted light diffracted by said diffracting means on the information recording surface of the first substrate and focuses +1st order diffracted light diffracted by said diffracting means on the information recording surface of the second substrate different from said first substrate in thickness, and a residual coma ZC meets the requirement, $$ZC = |L_1(J_2+D_2)/(J_1+D_1) - L_2| < 20$$

where $J_1$: off axis coma per unit angle toward the first substrate (mλ)

$J_2$: off axis coma per unit angle toward the second substrate (mλ)

$D_1$: coma per unit angle generated when the first substrate is tilted (mλ)

$D_2$: coma per unit angle generated when the second substrate is tilted (mλ)

$L_1$: axial coma of the lens toward the first substrate (mλ)

$L_2$: axial coma of the lens toward the second substrate (mλ).

4. The multiple focus objective lens according to claim 1, wherein said diffracting means is formed on one side of the lens.

5. The multiple focus objective lens according to claim 4, wherein said lens is a singlet having at least one aspheric surface.

6. The multiple focus objective lens according to claim 4, wherein said diffracting means is a conic circular phase grating.

7. The multiple focus objective lens according to claim 1, wherein said diffracting means is formed on a plane substrate.

8. The multiple focus objective lens according to claim 7, whose plane substrate is formed by glass-molding method or resin-molding method.

9. The multiple focus objective lens according to claim 1, wherein said diffracting means is a phase grating.

10. The multiple focus objective lens according to claim 1, wherein focusing is conducted by using the 0th order diffracted light and the +1st order diffracted light respectively toward two kinds of substrates of different thickness.

11. The multiple focus objective lens according to claim 10, which focuses the 0th order diffracted light toward the thicker substrate.

12. The multiple focus objective lens according to claim 10. which focuses the 0th order diffracted light toward the thinner substrate.

13. The multiple focus objective lens according to claim 1, which is a singlet having at least one aspheric surface, and the coma the objective lens has on the axis is generated when the first surface and the second surface of the lens are relatively tilted at 0.05°.

14. The multiple focus objective lens according to claim 1, which meets the requirements:

$$|fa^2(1/(fd \cdot Vd) + 1/(fs \cdot Vs))| < 0.0025$$

$$Vs = (n\lambda - 1)/(n\lambda(-) - n\lambda(+))$$

$$Vd = \lambda/(\lambda(-) - \lambda(+))$$

where:

λ: design wavelength

λ(+): a wavelength 10 nm longer than the design wavelength

λ(−): a wavelength 10 nm shorter than the design wavelength nλ: refractive index of lens for the design wavelength nλ(+): refractive index of lens at wavelength which is 10 nm longer than the design wavelength nλ(−): refractive index of lens at wavelength which is 10 nm shorter than the design wavelength fs: focal length of the lens defined by the 0th order diffracted light fd: focal length of the lens only by diffracting means fa: focal length of the lens defined by the +1st order diffracted light.

15. The multiple focus objective lens according to claim 1, in which at least one of the surfaces of the lens is integrated with the diffracting means and is formed by glass-molding method or resin-molding method.

16. An optical head apparatus which comprises a light source, means for focusing the light radiated from the light source on a surface of an information medium, means for separating beams modulated by said information medium, and means for receiving the light modulated by said information medium, wherein said focusing means is a multiple focus objective lens comprising a diffracting means whose aberration is corrected so that light beams having various diffracting orders focus respectively on plural substrates of different thickness, the lens is tilted to correct axial coma of the lens toward said substrates, the tilt angles to said substrates being substantially the same.

17. The optical head apparatus according to claim 16, whose multiple focus objective lens focuses 0th order diffracted light diffracted by the diffracting means on an information recording surface of a first substrate and focuses +1st order diffracted light diffracted by said diffracting means on an information recording surface of a second substrate which is different in thickness from said first substrate, and meets the requirement, $$L_1/(J_1+D_1) \neq L_2/(J_2+D_2)$$

where $J_1$: off axis coma per unit angle toward the first substrate (mλ)

$J_2$: off axis coma per unit angle toward the second substrate (mλ)

$D_1$ coma per unit angle generated when the first substrate is tilted (mλ)

$D_2$: coma per unit angle generated when the second substrate is tilted (mλ)

$L_1$: axial coma of the lens toward the first substrate (mλ)

$L_2$: axial coma of the lens toward the second substrate (mλ).

18. The optical head apparatus according to claim 16, whose multiple focus objective lens focuses 0th order diffracted light diffracted by said diffracting means on the information recording surface of the first substrate and focuses +1st order diffracted light diffracted by said diffracting means on the information recording surface of the second substrate different from said first substrate in thickness, and residual coma ZC meets the requirement, $$ZC=|L_1(J_2+D_2)/(J_1+D_1)-L_2|<20$$

where $J_1$: off axis coma per unit angle toward the first substrate (mλ)

$J_2$: off axis coma per unit angle toward the second substrate (mλ)

$D_1$: coma per unit angle generated when the first substrate is tilted (mλ)

$D_2$: coma per unit angle generated when the second substrate is tilted (mλ)

$L_1$: axial coma of the lens toward the first substrate (mλ)

$L_2$: axial coma of the lens toward the second substrate (mλ).

19. An optical information recording-reproducing apparatus which records and reproduces information on plural kinds of recording media of different thickness, by using an optical head apparatus which comprises a light source, means for focusing the light radiated from the light source on a surface of an information medium, means for separating beams modulated by said information medium, and means for receiving the light modulated by said information medium, wherein said focusing means is a multiple focus objective lens comprising a lens and a diffracting means whose aberration is corrected so that light beams having various diffracting orders focus respectively on plural substrates of different thickness, the lens is tilted to correct axial coma of the lens toward said substrates, the tilt angles with respect to said substrates being substantially the same.

20. The optical information recording-reproducing apparatus according to claim 19, whose multiple focus objective lens focuses 0th order diffracted light diffracted by said diffracting means on an information recording surface of a first substrate while focuses +1st order diffracted light diffracted by said diffracting means on an information recording surface of a second substrate different in thickness from said first substrate, and meets the requirement, $$L_1/(J_1+D_1) \neq L_2/(J_2+D_2)$$

where $J_1$: off axis coma per unit angle toward the first substrate (mλ)

$J_2$: off axis coma per unit angle toward the second substrate (mλ)

$D_1$: coma per unit angle generated when the first substrate is tilted (mλ)

$D_2$: coma per unit angle generated when the second substrate is tilted (mλ)

$L_1$: axial coma of the lens toward the first substrate (mλ)

$L_2$: axial coma of the lens toward the second substrate (mλ).

21. The optical information recording-reproducing apparatus according to claim 19, whose multiple focus objective lens focuses 0th order diffracted light diffracted by said diffracting means on the information recording surface of the first substrate and focuses +1st order diffracted light diffracted by said diffracting means on the information recording surface of the second substrate of different thickness from said first substrate, and residual coma ZC meets the requirement, $$ZC=|L_1(J_2+D_2)/(J_1+D_1)-L_2|<20$$

where $J_1$: off axis coma per unit angle toward the first substrate (mλ)

$J_2$: off axis coma per unit angle toward the second substrate (mλ)

$D_1$: coma per unit angle generated when the first substrate is tilted (mλ)

$D_2$: coma per unit angle generated when the second substrate is tilted (mλ)

$L_1$: axial coma of the lens toward the first substrate (mλ)

$L_2$: axial coma of the lens toward the second substrate (mλ).

* * * * *